R. S. TROTT.
VEHICLE SPRING.
APPLICATION FILED MAR. 29, 1911.
1,029,731.
Patented June 18, 1912.
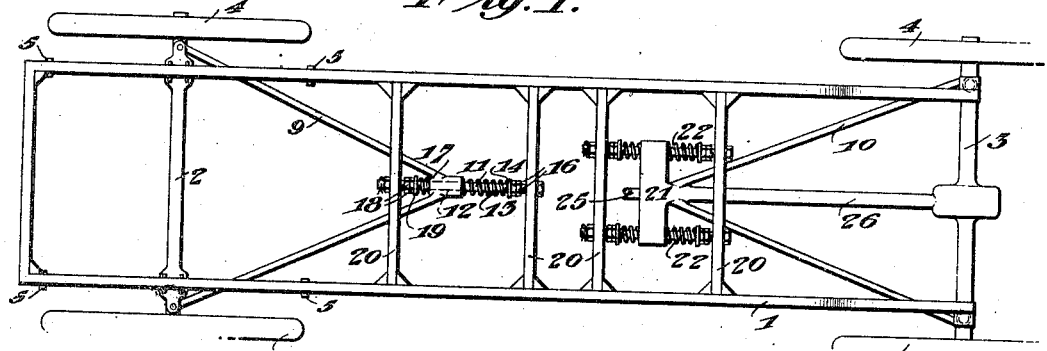
Fig. 1.
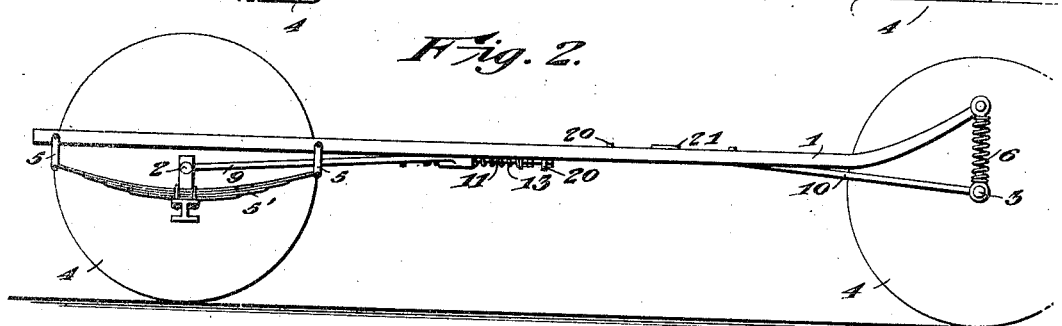
Fig. 2.
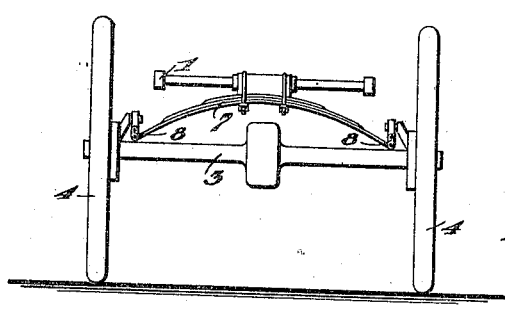
Fig. 3.
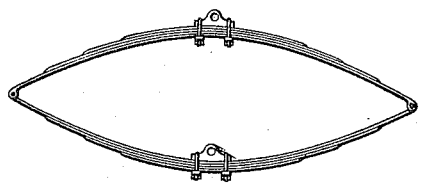
Fig. 4.
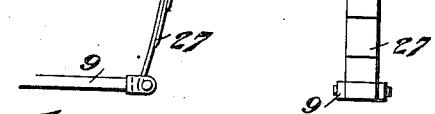
Fig. 5. Fig. 6.
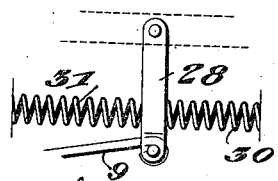
Fig. 7. Fig. 8.
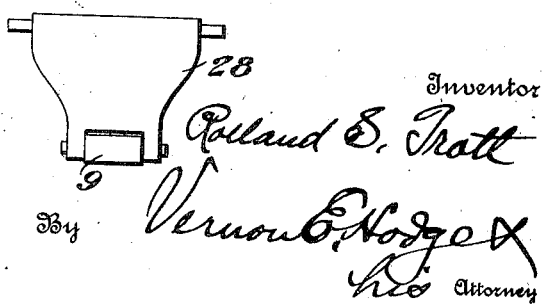
Witnesses
Lloyd W. Patch
Henry L. Albaugh
Inventor
Roland S. Trott
By Vernon E. Hodge
his Attorney

UNITED STATES PATENT OFFICE.

ROLLAND S. TROTT, OF DENVER, COLORADO.

REISSUED

VEHICLE-SPRING.

1,029,731.  Specification of Letters Patent.  Patented June 18, 1912.

Application filed March 29, 1911. Serial No. 617.715.

*To all whom it may concern:*

Be it known that I, ROLLAND S. TROTT, a citizen of the United States, residing at Denver, in the county of Denver and State of Colorado, have invented certain new and useful Improvements in Vehicle-Springs, of which the following is a specification.

My invention relates to an improvement in vehicle springs and is an improvement on my application Serial No. 508415, filed in the U. S. Patent Office July 19, 1909.

The objects of this invention are as follows: First, to provide a spring suspension for road vehicles that will permit the axles to give in the direct line of any jolt received, either vertical or horizontal, or the resultant of combined vertical and horizontal jolts.

A second object is to keep the axles in a position approximately at right angles to the frame at all times regardless of the direction or force of the jolts received.

In the accompanying drawings, Figure 1 is a plan view, Fig. 2 is a side elevation, Fig. 3 is an end view, Fig. 4, is a view of one of the load springs and Figs. 5, 6, 7 and 8 are details.

The numeral 1, indicates the frame of the vehicle; 2 and 3 are the axles and 4 are the wheels.
In Fig. 2, two forms of load springs are shown, namely the semielliptical spring 5′ connected to the axle 2 at its center and to the frame by links 5 at its ends; and another form of load spring shown at 6 at the right hand end of the Fig. 2, pivotally attached to both frame and axle. Still another form of load spring is illustrated in Fig. 3, indicated by the numeral 7, which is pivotally secured to the frame 1, with its ends pivotally connected to the axles as well as by means of the links 8, 8; and Fig. 4 shows a double elliptical load spring, pivotally attached to both frame and axle.

From the axles V shaped braces 9 and 10 extend toward the center of the vehicle frame. A rod 11 is fitted to a bore of an orifice 12, formed longitudinally through the apex of the V shaped brace 9 and on the inner end of this rod an alinement spring 13 is mounted abutting at one end against the apex of the brace 9 and at the other end against the washer 14 and the tension of this spring is regulated by lock nuts 16, 16, which turn on threads on the rod.
A rebound spring 17, is similarly mounted on the other end of the rod and its tension is adjusted by lock nuts 18, 18, turned on the threads of the rod against the washer 19. The rod itself is supported at its ends in cross bars 20, 20 of the frame 1. The brace 10, has a cross-head 21, at its inner end mounted slidably upon rods 22, 22, which are similar in construction to all intents and purposes to that of rod 11, only two are employed instead of one, they being provided with the same alinement and rebound springs and means of adjustment of the tension of these springs, and drive shaft 25 also embodied in construction in a tube 26. This alinement spring may be constructed in several different ways, in all of which the axle is kept square with the frame of the vehicle by means of the braces extending to the outer ends of the axle, but the latter is allowed backward motion against the pressure of the alinement spring or springs.

The connection between the braces and the frame may be sliding, as described above, with either leaf or spiral springs or may be by a toggle and leaf or spiral springs, or may be by a single leaf spring; when spiral springs are used rebound springs are also employed, which rebound function, however, the leaf spring performs by itself as well as taking the shock.

In Figs. 5 and 6 I have shown fragmentary details of one form of leaf-spring which might be used. A brace 9 is connected to a leaf spring 27, which is in turn connected to the frame. In Figs. 7 and 8 I have shown the brace 9 connected at its inner end to a toggle 28, which is pivoted to the frame, and on the forward and rear sides of the toggle are mounted shock and rebound springs 30 and 31. In the two modified forms of shock and rebound spring shown, the action would be substantially the same as the structure disclosed in Figs. 1 and 2.

From the foregoing it will be seen that one spring, called the load spring, carries the load and takes the vertical components of the road shocks, the other spring carries no load and takes the horizontal components of the road shocks by permitting the axle to move backward with respect to the car body. At least four different load springs may be used, all of them either by themselves or by the aid of links, permitting a link connection between the car body and the axle, allowing the axle to move backward without stress to the load spring, against the alinement spring, which latter is illustrated in the detail views.

Having fully described my invention what I claim as new and desire to secure by Letters-Patent is.

1. The combination with a vehicle frame and axle, of means extending inwardly from the axle and connected with the frame adapted to maintain an approximately right-angular alinement between the frame and axle, and acting to resiliently oppose longitudinal movement of the axle.

2. The combination with a vehicle frame and axle, of a brace extending inwardly from the axle and connected with the frame, said brace adapted to maintain an approximately right-angular alinement between the frame and axle, and means adapted to resiliently oppose longitudinal movement of the brace.

3. The combination with a vehicle frame and axle, of a brace extending from the axle in the direction of the longitudinal center of the frame and connected with the latter and an alinement spring, so connected with the brace as to admit of a horizontal longitudinal movement of the axle, but acting to preclude lateral or side movement thereof.

4. The combination with a vehicle frame and axle, of a brace extending in the direction of the longitudinal center of the frame, said brace adapted to maintain an approximately right-angular alinement between the frame and axle, a rod secured to the frame with which the brace has sliding connection and an alinement spring bearing against the brace.

5. The combination with a vehicle frame and axle of a brace extending in the direction of the longitudinal center of the frame, said brace adapted to maintain an approximately right-angular alinement between the frame and axle, a rod secured to the frame with which the brace has sliding connection and an alinement spring bearing against the brace, and means for adjusting the tension of the alinement spring.

6. The combination with vehicle frame, axles, load springs, braces extending from the axle toward the center of the frame, said braces adapted to maintain an approximately right-angular alinement between the frame and axle, rods secured to the frame with which the inner ends of the braces have sliding connection, alinement and rebound springs on opposite ends of the rods bearing against the braces.

7. The combination with vehicle frame, axles, load springs, braces extending from the axles toward the center of the frame, said braces adapted to maintain an approximately right-angular alinement between the frame and axle, rods secured to the frame with which the inner ends of the braces have sliding connection, alinement and rebound springs on opposite ends of the rods bearing against the braces, and means for adjusting and regulating the tension of the alinement and rebound springs.

In testimony whereof I affix my signature, in the presence of two witnesses.

ROLLAND S. TROTT.

Witnesses:
JAMES R. KILLIAN,
VERNON E. HODGES.